US012126685B2

(12) United States Patent
Kim et al.

(10) Patent No.: US 12,126,685 B2
(45) Date of Patent: Oct. 22, 2024

(54) NETWORK CONNECTION METHOD AND ELECTRONIC DEVICE SUPPORTING SAME

(71) Applicant: Samsung Electronics Co., Ltd., Suwon-si (KR)

(72) Inventors: Geunwoo Kim, Suwon-si (KR); Md. Imtiaz Hossain, Dacca (BD); Muhammad Mushfiqul Islam, Dacca (BD); Towhidul Islam, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/940,444

(22) Filed: Sep. 8, 2022

(65) Prior Publication Data
US 2023/0007088 A1    Jan. 5, 2023

Related U.S. Application Data

(63) Continuation of application No. PCT/KR2021/002224, filed on Feb. 23, 2021.

(30) Foreign Application Priority Data

Mar. 12, 2020    (KR) .......................... 10-2020-0030834

(51) Int. Cl.
*H04L 67/141*    (2022.01)
*G06F 3/14*    (2006.01)
(Continued)

(52) U.S. Cl.
CPC .......... *H04L 67/141* (2013.01); *G06F 3/1454* (2013.01); *H04L 47/82* (2013.01); *H04L 65/40* (2013.01); *H04L 67/1095* (2013.01)

(58) Field of Classification Search
CPC ....... H04L 67/51; H04L 67/56; H04L 67/141; H04L 67/568; H04L 67/1095;
(Continued)

(56) References Cited

U.S. PATENT DOCUMENTS 10,587,566 B2    3/2020    Kim et al.
10,866,706 B2 *  12/2020   Keam .................. G06F 3/14
(Continued)

FOREIGN PATENT DOCUMENTS

CN    101309189 B    11/2008
KR    10-1619897 B1   5/2016
(Continued)

OTHER PUBLICATIONS

Korean Office Action dated Jul. 15, 2024, issued in Korean Application No. 10-2020-0030834.

*Primary Examiner* — James N Fiorillo
(74) *Attorney, Agent, or Firm* — Jefferson IP Law, LLP

(57) ABSTRACT

An electronic device includes a first communication module, a second communication module, a display, a processor, and a memory storing instructions causing the processor to receive, from an external electronic device connected via the first communication module, first data related to a first screen on which resources of the external electronic device are configured in accordance with a graphic environment of the electronic device, output the first screen on the display, request the external electronic device to execute a selected first resource, receive, from the external electronic device, a request for obtaining second data related to the first resource, connect to the network via the second communication module to obtain the second data, transmit the obtained second data to the external electronic device, receive, from the external electronic device, third data related to a second screen configured using the second data, and output the second screen on the display.

12 Claims, 9 Drawing Sheets

(51) Int. Cl.
*H04L 47/70* (2022.01)
*H04L 65/40* (2022.01)
*H04L 67/1095* (2022.01)

(58) Field of Classification Search
CPC ......... H04L 47/70; H04L 47/82; H04L 65/40;
H04L 65/1016; H04L 65/1045; H04L
65/1069; H04L 12/54; H04L 12/407;
H04L 29/08648; H04L 29/08765; H04L
29/08882; G06F 3/14; G06F 3/0481;
G06F 3/1454; G06F 3/04842; G06F
3/04845; G09G 2370/04; G09G 2370/10;
H04W 4/008; H04W 4/16
USPC .......................................................... 709/226
See application file for complete search history.

(56) References Cited

U.S. PATENT DOCUMENTS

| | | | |
|---|---|---|---|
| 10,913,353 B2 * | 2/2021 | Kim | .................. B60K 35/80 |
| 10,963,211 B2 * | 3/2021 | Park | ..................... G06F 3/1454 |
| 11,146,499 B2 | 10/2021 | Sung et al. | |
| 11,599,321 B2 | 3/2023 | You et al. | |
| 2007/0276864 A1 * | 11/2007 | Espelien | ............ H04N 21/4622 |
| 2009/0075697 A1 * | 3/2009 | Wilson | ................... A01G 23/04 |
| | | | 455/557 |
| 2010/0058229 A1 * | 3/2010 | Mercer | .................... G09G 5/14 |
| | | | 715/788 |
| 2012/0084798 A1 * | 4/2012 | Reeves | ................... G09G 5/399 |
| | | | 719/319 |
| 2014/0095659 A1 * | 4/2014 | Won | ........................ H04L 67/06 |
| | | | 709/217 |
| 2015/0113455 A1 * | 4/2015 | Kang | .................. G06F 3/04883 |
| | | | 715/765 |
| 2015/0245186 A1 * | 8/2015 | Park | ........................ H04W 4/16 |
| | | | 455/417 |
| 2016/0048299 A1 * | 2/2016 | Sirpal | .................... G06F 3/0486 |
| | | | 715/761 |
| 2016/0112839 A1 * | 4/2016 | Choi | ....................... H04W 4/80 |
| | | | 455/41.2 |
| 2016/0242053 A1 * | 8/2016 | Leontiadis | ............ H04L 41/065 |
| 2019/0097867 A1 * | 3/2019 | Qiu | ........................ H04L 67/51 |
| 2019/0260497 A1 * | 8/2019 | Wang | .................... H04L 1/0009 |
| 2019/0356713 A1 * | 11/2019 | Demange | ................ H04W 4/42 |
| 2020/0045124 A1 * | 2/2020 | Wayama | ............. H04L 41/0226 |
| 2020/0366799 A1 * | 11/2020 | Tokunaga | ........... H04N 1/00214 |
| 2020/0396291 A1 * | 12/2020 | Heydlauf | ................ G16H 40/67 |
| 2020/0401360 A1 * | 12/2020 | You | ...................... G06F 13/4282 |
| 2020/0404573 A1 * | 12/2020 | Athlur | ..................... H04W 4/06 |

FOREIGN PATENT DOCUMENTS

| | | |
|---|---|---|
| KR | 10-2018-0052429 A | 5/2018 |
| KR | 10-2018-0109596 A | 10/2018 |
| KR | 10-2019-0021562 A | 3/2019 |
| KR | 10-2019-0052749 A | 5/2019 |
| KR | 10-2019-0101580 A | 9/2019 |
| WO | 2017/171340 A1 | 10/2017 |

* cited by examiner

NETWORK CONNECTION METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2021/002224, filed on Feb. 23, 2021, which is based on and claims the benefit of a Korean patent application number 10-2020-0030834, filed on Mar. 12, 2020, in the Korean Intellectual Property Office, the disclosure of which is incorporated by reference herein in its entirety.

BACKGROUND

1. Field

The disclosure relates to a network connection technique.

2. Description of Related Art

With the development of mobile communication technology, mobile electronic devices with enhanced mobility and portability, such as smartphones, are in the spotlight. These mobile electronic devices may provide multimedia services such as music and video playback and network-based communication services such as calls, wireless Internet access, and message transmission and reception through various applications.

In addition, as convergence solutions such as an integrated control and synchronization function of various electronic devices has recently become an issue, a technique for improving convenience of a user who wants to use a plurality of devices has been actively developed. As an example, there is an emerging execution environment sharing technique (e.g., a Samsung DeX service) for operating an electronic device, such as a mobile electronic device, which is becoming lighter, thinner, and smaller, in an execution environment similar to a general Personal Computer (PC) such as a desktop computer.

The execution environment sharing technique may include, for example, a function by which an execution screen of an application installed in an electronic device is configured in accordance with a graphic environment of an external electronic device and the execution screen is displayed on a display of the external electronic device. In order to perform such a function, when the electronic device is coupled directly to the external electronic device via a Universal Serial Bus (USB) cable or mounted to a docking device coupled to the external electronic device or is coupled through wireless communication, the electronic device may transmit, to the external electronic device, data of a screen configured in accordance with the graphic environment of the external electronic device and display the screen on the display of the external electronic device by using the received data.

The above information is presented as background information only to assist with an understanding of the disclosure. No determination has been made, and no assertion is made, as to whether any of the above might be applicable as prior art with regard to the disclosure.

SUMMARY

However, the existing execution environment sharing technique was limited to a function of sharing the graphic environment, and thus was not able to provide a function of sharing a communication environment for a network connection. For example, when an electronic device is not able to connect to a network, even if an external electronic device is able to connect to a network, the electronic device was not able to obtain data from the network.

Aspects of the disclosure are to address at least the above-mentioned problems and/or disadvantages and to provide at least the advantages described below. Accordingly, an aspect of the disclosure is to provide a method of connecting to a network via an external electronic device connected to share an execution environment when an electronic device is not able to connect to the network, and the electronic device supporting the method.

Another aspect of the disclosure is to provide a method of improving network connection performance via an external electronic device connected to share an execution environment when a network connection state of an electronic device is less than or equal to a specified level, and the electronic device supporting the method.

Additional aspects will be set forth in part in the description which follows and, in part, will be apparent from the description, or may be learned by practice of the presented embodiments.

In accordance with an aspect of the disclosure, an electronic device is provided. The electronic device includes a first communication module, a second communication module, a display, at least one processor operatively coupled to the first communication module, the second communication module, and the display, and a memory operatively coupled to the at least one processor. The memory may store instructions, when executed, causing the at least one processor to receive, from an external electronic device connected via the first communication module, first data related to a first screen on which resources of the external electronic device are configured in accordance with a graphic environment of the electronic device, output the first screen on the display, based on the received first data, when a first resource is selected from among the resources, request the external electronic device to execute the selected first resource via the first communication module, receive, from the external electronic device via the first communication module, a request for obtaining second data related to the first resource through a network connection, connect to the network via the second communication module to obtain the second data, transmit the obtained second data to the external electronic device via the first communication module, receive, from the external electronic device via the first communication module, third data related to a second screen configured using the second data, and output the second screen on the display, based on the received third data.

In accordance with another aspect of the disclosure, an electronic device is provided. The electronic device includes a first communication module, a second communication module, at least one processor operatively coupled to the first communication module and the second communication module, and a memory operatively coupled to the at least one processor. The memory may store instructions, when executed, causing the at least one processor to receive, from an external electronic device connected via the first communication module, first data related to a first screen on which resources of the external electronic device are configured in accordance with a graphic environment of the electronic device, output the first screen on the display, based on the received first data, when a first resource is selected from among the resources, request the external electronic device to execute the selected first resource via the first communication module, receive, from the external electronic device via the first communication module, a request for obtaining second data related to the first resource through a network connection, connect to the network via the second communication module to obtain the second data, transmit the obtained second data to the external electronic device via the first communication module, receive, from the external electronic device via the first communication module, third data related to a second screen configured using the second data, and output the second screen on the display, based on the received third data.

In accordance with another aspect of the disclosure, a network connection method of an electronic device is provided. The network connection method includes receiving, from an external electronic device connected via a first communication module of the electronic device, first data related to a first screen on which resources of the external electronic device are configured in accordance with a graphic environment of the electronic device, outputting the first screen on a display of the electronic device, based on the received first data, when a first resource is selected from among the resources, requesting the external electronic device to execute the selected first resource via the first communication module, receiving, from the external electronic device via the first communication module, a request for obtaining second data related to the first resource through a network connection, connecting to the network via a second communication module of the electronic device to obtain the second data, transmitting the obtained second data to the external electronic device via the first communication module, receiving, from the external electronic device via the first communication module, third data related to a second screen configured using the second data, and outputting the second screen on the display, based on the received third data.

According to various embodiments of the disclosure, an electronic device connects to a network via an external electronic device even if it is impossible to connect to the network. This increases usability and convenience in sharing an execution environment.

In addition, according to various embodiments of the disclosure, network connection performance is improved via an external electronic device connected to share an execution environment. This also increases usability of a network connection resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
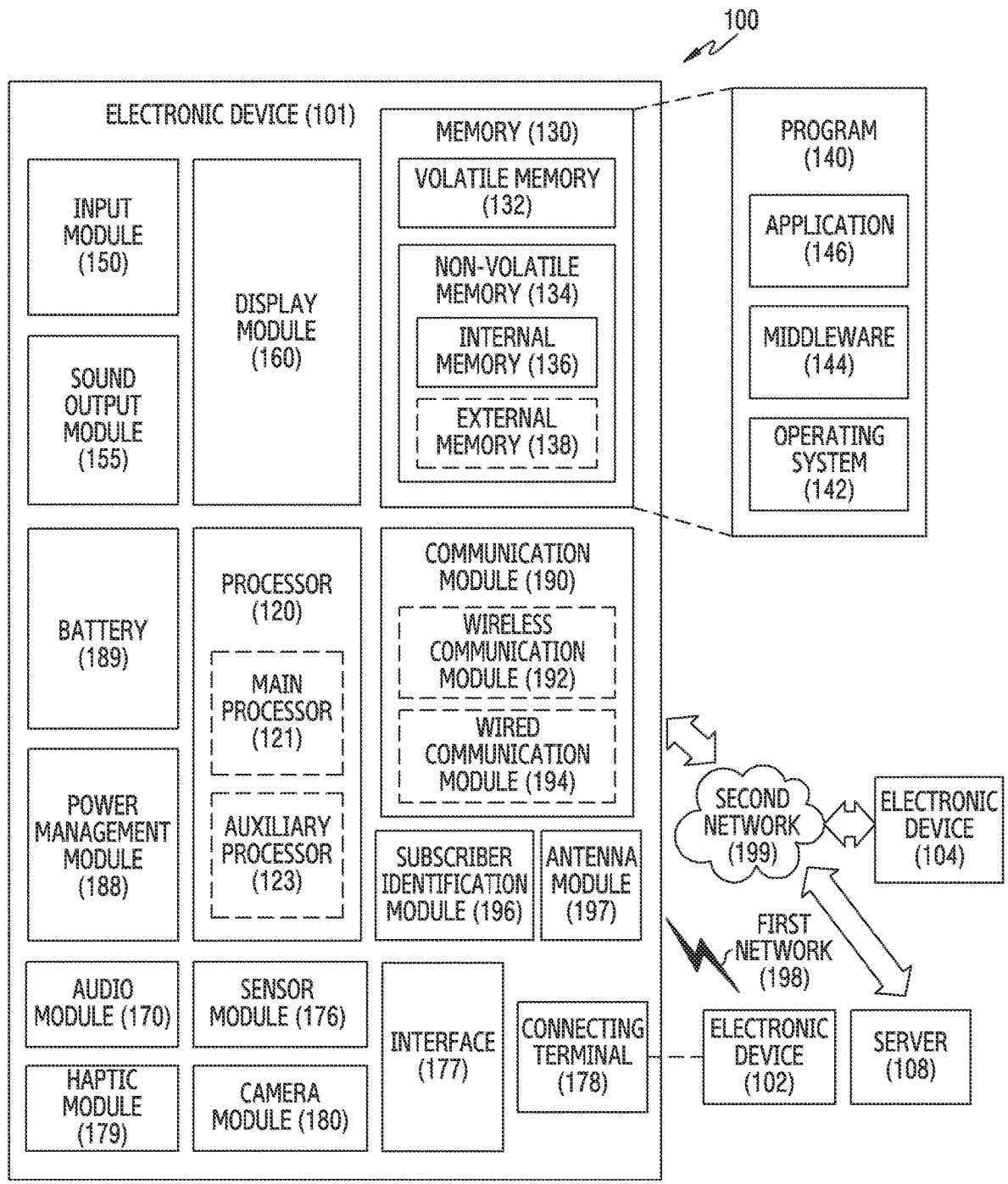
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150 (i.e., pen, keyboard, mouse, and the like), a sound output module 155, a display module 160 (i.e., a digital television (TV), a liquid crystal display (LCD), organic light emitting diodes (OLED) display, and the like), an audio module 170, a sensor module 176, an interface 177, a connecting terminal 178, a haptic module 179, a camera module 180, a power management module 188, a battery 189, a communication module 190 (i.e., a transmitter, a receiver, a Universal Serial Bus (USB) cable, an ethernet cable, and the like), a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may be configured to perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, in a case in which the electronic device 101 includes a main processor 121 and an auxiliary processor 123, the auxiliary processor 123 may be adapted to consume less power than the main processor 121, or to be specific to a specified function. The auxiliary processor 123 may be implemented as separate from, or as part of the main processor 121.

In an embodiment, the auxiliary processor 123 may control at least some of functions or states related to at least one component (e.g., the display module 160, the sensor module 176, or the communication module 190) among the components of the electronic device 101, or instead of the main processor 121 while the main processor 121 is in an inactive (e.g., sleep) state, or together with the main processor 121 while the main processor 121 is in an active state (e.g., executing an application). According to another embodiment, the auxiliary processor 123 (e.g., an image signal processor or a communication processor) may be implemented as part of another component (e.g., the camera module 180 or the communication module 190) functionally related to the auxiliary processor 123. According to still another embodiment, the auxiliary processor 123 (e.g., a neural processing unit) may include a hardware structure specified for artificial intelligence model processing. An artificial intelligence model may be generated by machine learning, natural language processing, neural network processing, and the like. Such learning may be performed, e.g., by the electronic device 101 where the artificial intelligence is performed or via a separate server (e.g., the server 108). Learning algorithms may include, but are not limited to, supervised learning, unsupervised learning, semi-supervised learning, or reinforcement learning. The artificial intelligence model, for example, may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include a volatile memory 132 or a non-volatile memory 134.

The program 140 may be stored in the memory 130 as software, and may include, for example, an operating system (OS) 142, middleware 144, or an application 146.

The input module 150 (i.e., pen, keyboard, mouse, and the like) may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. According to an embodiment, the receiver may be used for receiving incoming calls. According to another embodiment, the receiver may be implemented as separate from, or as part of the speaker.

The display module 160 may visually provide information to the outside (e.g., a user) of the electronic device 101. According to an embodiment, the display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may, for example, obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101. The sensor module 176 may then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support at least one specified protocol to be used for the electronic device 101 to be coupled with the external electronic device (e.g., the electronic device 102) directly (e.g., wiredly) or wirelessly. According to an embodiment, the interface 177 may include a high definition multimedia interface (HDMI), a universal serial bus (USB) interface, a secure digital (SD) card interface, or an audio interface, but is not limited thereto.

The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may be configured to convert an electrical signal into a mechanical stimulus (e.g., a vibration or a movement) or electrical stimulus which may be recognized by a user via his tactile sensation or kinesthetic sensation. According to an embodiment, the haptic module 179 may include a motor, a piezoelectric element, or an electric stimulator, but is not limited thereto.

The camera module 180 may capture a still image or moving images. According to an embodiment, the camera module 180 may include an optical element that may include one or more lenses, image sensors, image signal processors, an aperture, a shutter, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel According to an embodiment, the communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as a first network 198 or a second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC), but is not limited thereto. The wireless communication module 192 may support a high-frequency band (e.g., the mmWave band) to achieve, e.g., a high data transmission rate. According to an embodiment, the wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas or multiple connected antennas). In such a case, at least one antenna appropriate for a communication scheme used in the communication network, such as a first network 198 or a second network 199, may be selected, for example, by a communication module 190 (e.g., the wireless communication module 192) from the plurality of antennas. The signal or the power may then be transmitted or received between the communication module 190 and the external electronic device via the selected at least one antenna. According to still another embodiment, another component (e.g., a radio frequency integrated circuit (RFIC)) other than the radiating element may be additionally formed as part of the antenna module 197.

According to an embodiment, the antenna module 197 may form a mmWave antenna module. According to another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas or multiple connected antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between an electronic device 101 and an external electronic device 104 via a server 108 coupled with a second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices 102, 104, or 108 to perform at least part of the function or the service. The one or more external electronic devices 102, 104, or 108 receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. In addition, the electronic device 101 may provide ultra low-latency services using, e.g., distributed computing or mobile edge computing. In another embodiment, the external electronic device 104 may include an internet-of-things (IoT) device such as a heart monitor, robotic vacuum, a smart watch, and the like. The server 108 may be an intelligent server using artificial intelligence, machine learning, and/or a neural network. According to still another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
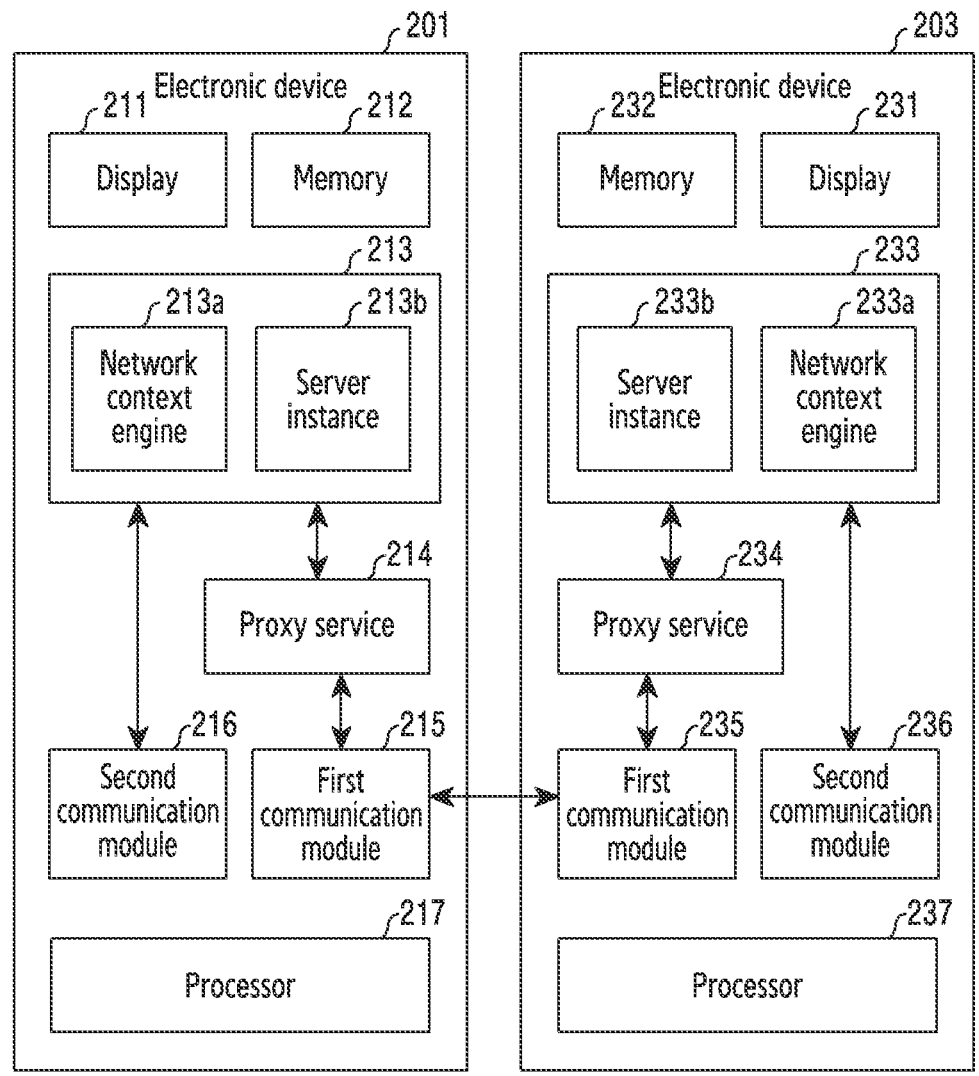
FIG. 2 illustrates an electronic device for sharing an execution environment according to an embodiment of the disclosure.

FIG. 2 illustrates an electronic device for sharing an execution environment according to an embodiment of the disclosure.

A first electronic device 201 and a second electronic device 203 may share the execution environment. According to an embodiment, the first electronic device 201 may configure an execution screen of an application installed in the second electronic device 203 in accordance with a graphic environment of the first electronic device 201 and may display the execution screen on a display 211 of the first electronic device 201. In this case, a user interface being displayed on the display 211 of the first electronic device 201 may be maintained. Additionally, the execution screen of the application installed in the second electronic device 203, which may be configured in accordance with a graphic environment of the first electronic device 201, may be displayed on the user interface. According to another embodiment, the second electronic device 203 may also configure an execution screen of an application installed in the first electronic device 201 in accordance with a graphic environment of the second electronic device 203, and may display the screen on a display 231 of the second electronic device. In this case, a user interface being displayed on the display 231 of the second electronic device 203 may be maintained. Additionally, the execution screen of the application installed in the first electronic device 201, which may be configured in accordance with the graphic environment of the second electronic device 203, may be displayed on the user interface.

Displayed applications may operate independently in a first electronic device 201 and a second electronic device 203. Even if a first application in the first electronic device 201 and a second application installed in the second electronic device 203 are applications of the same type, an execution screen of the first application and an execution screen of the second application may be displayed individually, and an execution screen change depending on an operation in each application may also be applied individually. As an example, in a situation in which the execution screen of the second application installed in the second electronic device 203 is configured in accordance with the graphic environment of the first electronic device 201 and is displayed on the display 211 of the first electronic device 201, the execution screen of the second application may be displayed on the display 211 separately from the execution screen of the first application installed in the first electronic device 201. In addition, a first application may be executed and controlled by a processor 217 of the first electronic device 201, and a second application may be executed and controlled by a processor 237 of the second electronic device 203.

According to an embodiment, the first electronic device 201 and the second electronic device 203, which share an execution environment, may be directly coupled through wired communication by using first communication modules 215 and 235 (e.g., a USB cable, ethernet cable, transceiver, and the like) or may be coupled to each other by being coupled to a docking device coupled to the first electronic device 201 or the second electronic device 203. According to another embodiment, the first electronic device 201 and the second electronic device 203 may be coupled through wireless communication by using the first communication modules 215 and 235.

According to still another embodiment, the first electronic device 201 and the second electronic device 203, which share an execution environment, may share a communication environment for a network connection, in addition to a function of sharing a graphic environment. As an example, in a situation in which the first electronic device 201 is not able to connect to a network, the connection to the network may be achieved via a communication module (e.g., a second communication module 236 of the second electronic device 203). As another example, in a situation in which the second electronic device 203 is not able to connect to the network, the network connection may be achieved via a communication module (e.g., a second communication module 216 of the first electronic device 201).

Referring to FIG. 2, in order to provide the aforementioned function, the first electronic device 201 and the second electronic device 203 may include the displays 211 and 231 (e.g., the display module 160), memories 212 and 232 (e.g., the memory 130), network connection modules 213 and 233, proxy services 214 and 234, the first communication modules 215 and 235 (e.g., the communication module 190), the second communication modules 216 and 236 (e.g., the communication module 190), and the processor 217 and 237 (e.g., the processor 120). The first electronic device 201 and the second electronic device 203 are not limited to this structure. According to an embodiment, the first electronic device 201 or the second electronic device 203 may omit at least one of the aforementioned components, and may further include one or more other components.

The displays 211 and 231 may display a variety of content (e.g., a text, an image, a video, an icon, a symbol, etc.) to be provided to the user. According to an embodiment, the displays 211 and 231 may include a touch screen, and may receive, for example, a touch, gesture, proximity, or hovering input using an electronic pen or a user's body part.

According to another embodiment, the displays 211 and 231 may output a screen on which resources of an external electronic device (e.g., the second electronic device 203 when the display 211 is included in the first electronic device 201, and the first electronic device 201 when the display 231 is included in the second electronic device 203) are configured in accordance with a graphic environment of the displays 211 and 231.

According to an embodiment, the memories 212 and 232 may be configured to store a variety of data used by at least one component of the electronic device (e.g., the first electronic device 201 or the second electronic device 203). According to another embodiment, the memories 212 and 232 may store machine readable instructions and data related to sharing of an execution environment. According to still another embodiment, the memories 212 and 232 may cache a network connection request received from an external electronic device.

The network connection modules 213 and 233 may monitor network performance of an electronic device (e.g., the first electronic device 201 when the first communication module 215 is included in the first electronic device 201, and the second electronic device 203 when the first communication module 235 is included in the second electronic device 203) and an external electronic device (e.g., the second electronic device 203 when the first communication module 215 is included in the first electronic device 201, and the first electronic device 201 when the first communication module 235 is included in the second electronic device 203) coupled to the electronic device, and may provide a best network connection state, based on the monitored network performance.

To provide the aforementioned function, the network connection modules 213 and 233 may include network context engines 213a and 233a and server instances 213b and 233b. According to an embodiment, the network connection modules 213 and 233 may load a communication driver (e.g., a USB/IP driver) for connecting an electronic device and an external electronic device to the memories 212 and 232, and may exchange (via a handshake protocol) connection information of the electronic device and the external electronic device. After exchanging the connection information, the network connection modules 213 and 233 may operate by a default according to the connection information such that the server instance 213b of the electronic device operates in a server mode and the server instance 233b of the external electronic device operates in a gateway mode for forwarding to the server instance 213b of the electronic device.

According to another embodiment, the network context engines 213a and 122a may persistently monitor a network connection state (e.g., signal strength, connection adaptor information, packet information, etc.) of the electronic device and the external electronic device.

According to still another embodiment, the network context engines 213a and 233a may obtain information resulted from monitoring a connection state in which a network is connected via the second communication modules 216 and 236. The network context engine 213a included in the first electronic device 201 may obtain information resulted from monitoring the connection state in which the network is connected via the second communication module 216 included in the first electronic device 201. In addition, the network context engine 233a included in the second electronic device 203 may obtain information resulted from monitoring the connection state in which the network is connected via second communication module 236 included in the second electronic device 203.

According to an embodiment, the network context engines 213a and 233a may receive, from an external electronic device via the first communication modules 215 and 235, information resulted from monitoring a connection state in which a network is connected via the second communication modules 216 and 236 included in the external electronic device. The network context engine 213a may receive, from the second electronic device 203 via the first communication module 215, information resulted from monitoring the connection state in which the network is connected via the second communication module 236 included in the second electronic device 203. In addition, the network context engine 233a included in the second electronic device 203 may receive, from the first electronic device 201 via the first communication module 235, information resulted from monitoring the connection state in which the network is connected via the second communication module 216 included in the first electronic device 201.

According to another embodiment, the network context engines 213a and 233a may determine that a network connection failure occurs in an electronic device or an external electronic device. In addition, when the network connection failure occurs in any one of the electronic device and the external electronic device, the network context engines 213a and 233a may request for the network connection (i.e., network connection forwarding) using another device having a smooth network connection. In a situation in which a network connection via the second communication module 216 included in the first electronic device 201 has failed, the network context engine 213a included in the first electronic device 201 may request the second electronic device 203 via the first communication module 215 to establish a network connection via the second communication module 236 included in the second electronic device 203. In this case, the server instance 233b of the second electronic device 203 may operate in the server mode, and the proxy service 214 of the first electronic device 201 may forward to the server instance 233b of the second electronic device 203. When a network connection via the second communication module 236 included in the second electronic device 203 has failed, the network context engine 233a included in the second electronic device 203 may request the first electronic device 201 via the first communication module 235 to establish a network connection via the second communication module 216 included in the first electronic device 201. In this case, the server instance 213b of the first electronic device 201 may operate in the server mode, and the proxy service 234 of the second electronic device 203 may forward to the server instance 213b of the first electronic device 201.

According to an embodiment, when a network connection failure occurs in both the electronic device and the external electronic device, the network context engines 213a and 233a may enable connection of all adaptors included in the electronic device and the external electronic device, based on network adapter information. In addition, when the network context engines 213a and 233a are connected to at least one adapter, a network connection may be established through the connected adaptor.

According to another embodiment, the network context engines 213a and 233a may determine a communication module for a network connection, based on information resulted from monitoring a connection state in which the electronic device and the external electronic device are connected to the network. The network context engines 213*a* and 233*a* may determine a communication module having a better connection state between a network connection state based on the second communication module 216 included in the first electronic device 201 and a network connection state based on the second communication module 236 included in the second electronic device 203, as the communication module for the network connection. According to still another embodiment, the network context engines 213*a* and 233*a* may determine the communication module for the network connection by considering cost of the network connection via the second communication module 216 included in the first electronic device 201 and cost of the network connection via the second communication module 236 included in the second electronic device 203. In a case in which both the network connection state based on the second communication module 216 included in the first electronic device 201 and the network connection state based on the second communication module 236 included in the second electronic device 203 are good, the network context engines 213*a* and 233*a* may determine a communication module with lower cost as the communication module for network connection.

According to an embodiment, the network context engines 213*a* and 233*a* may refer to a predefined quality level table of a network connection performance between the electronic device and the external electronic device to establish a network connection via a communication module having better connection performance as master connection. The network context engines 213*a* and 233*a* may dynamically provide an operation of dispatching network interfaces (e.g., the second communication modules 216 and 236) connectable to the electronic device and the external electronic device through a network to any one of the network interfaces.

According to another embodiment, the network context engines 213*a* and 233*a* may monitor upload/download packets through the network, and when a network interface for uploading/downloading the packets is overloaded, may be combined with a threaded download manager or the like up to the other side of the network, thereby increasing network performance. For example, when any one of the network interfaces (e.g., the second communication modules 216 and 236) is overloaded, the network context engines 213*a* and 233*a* may upload/download a packet through another network interface.

According to still another embodiment, based on the information resulted from monitoring the connection state in which a network is connected via the second communication module 216 included in the first electronic device 201 and the second communication module 236 included in the second electronic device 203, the network context engines 213*a* and 233*a* may connect to the network via the second communication module 216 included in the first electronic device 201 to obtain a part of data to be obtained, and may connect to the network via the second communication module 236 included in the second electronic device 203 to obtain the other part of the data to be obtained. In this situation, based on the information resulted from the monitoring, the network context engines 213*a* and 233*a* may determine a size of data to be obtained via the second communication module 216 included in the first electronic device 201 and a size of data to be obtained via the second communication module 236 included in the second electronic device 203. The network context engines 213*a* and 233*a* may determine the size of data to obtain more data via a communication module having a better communication state.

According to an embodiment, the proxy services 214 and 234 may set up a proxy server for connecting to the network via the second communication modules 216 and 236. In addition, the proxy services 214 and 234 may transmit a setting value (e.g., IP information and port information) of the proxy server to the external electronic device.

According to another embodiment, the proxy services 214 and 234 may block malicious code and access by unauthorized users through proxy settings.

According to still another embodiment, the proxy services 214 and 234 may cache requests (e.g., network connection requests) incoming to the proxy server. As such, the proxy services 214 and 234 may reduce unnecessary remote server access and consequently reduce traffic to the outside, thereby preventing a bottleneck from occurring.

The first communication modules 215 and 235 may support communication between an electronic device and an external electronic device. For example, the first electronic device 201 and the second electronic device 203 may be connected via the first communication modules 215 and 235. According to an embodiment, the first communication modules 215 and 235 may support wired communication or wireless communication.

The second communication modules 216 and 236 may support a network connection. As an example, each of the second communication module 216 included in the first electronic device 201 and the second communication module 236 included in the second electronic device 203 may support Internet connection. According to an embodiment, the second communication modules 216 and 236 may support wired communication or wireless communication.

The processors 217 and 237 may control at least one other component of the electronic device, and may perform various data processing or operations. According to an embodiment, the processors 217 and 237 may execute instructions related to the network connection, included in the memories 212 and 232.

According to another embodiment, the processors 217 and 237 may receive, from the external electronic device connected via the first communication modules 215 and 235, data related to a screen on which resources of the external electronic device are configured in accordance with a graphic environment of the electronic device, and may output to the displays 211 and 231 the screen configured in accordance with the graphic environment of the electronic device, based on the received data. When a resource requiring a network connection is selected from among the resources included in the screen output on the displays 211 and 231, the processors 217 and 237 may request the external electronic device to execute the selected resource via the first communication modules 215 and 235. In this case, upon determining that it is impossible to connect to the network via the second communication modules 216 and 236, the external electronic device may request the electronic device to obtain data related to the selected resource via the first communication modules 215 and 235.

Upon receiving a request for obtaining data related to the selected resource from the electronic device through a network connection by using the first communication modules 215 and 235, the processors 217 and 237 may connect to the network via the second communication modules 216 and 236 to obtain the data. In addition, the processors 217 and 237 may transmit the obtained data to the external electronic device via the first communication modules 215 and 235. In this case, the external electronic device may configure a screen in accordance with the graphic environment of the electronic device by using the data obtained from the electronic device via the first communication modules 215 and 235, and may transmit data related to the configured screen to the electronic device via the first communication modules 215 and 235.

According to an embodiment, the processors 217 and 237 may output the screen to the displays 211 and 231, based on data received from the external electronic device via the first communication modules 215 and 235. The screen may include, for example, an internet access screen.

According to another embodiment, the processors 217 and 237 may obtain first information resulted from monitoring a first connection state in which the network is connected via the second communication modules 216 and 236, and may receive, from the external electronic device via the first communication modules 215 and 235, second information resulted from monitoring a second connection state in which the network is connected via the second communication modules 216 and 236 included in the external electronic device. Based on the first information and the second information, the processors 217 and 237 may determine a communication module for obtaining data via the network connection among the second communication modules 216 and 236 included in the electronic device and the second communication modules 216 and 236 included in the external electronic device.

According to still another embodiment, upon determining, based on the first information and the second information, that it is possible to connect to the network via the second communication modules 216 and 236 included in the electronic device and the second communication modules 216 and 236 included in the external electronic device, the processors 217 and 237 may obtain a first part of data to be obtained via the second communication modules 216 and 236 included in the electronic device and transmit it to the external electronic device via the first communication modules 215 and 235, and may request the external electronic device via the first communication modules 215 and 235 so that the external electronic device obtains a second part of the data via the second communication modules 216 and 236 included in the external electronic device. In this case, the processors 217 and 237 may determine a size of the first part and a size of the second part, based on the first information and the second information.

According to an embodiment, the processors 217 and 237 may set up a proxy server for connecting to the network via the second communication modules 216 and 236, and may transmit a setting value of the proxy server to the external electronic device via the first communication modules 215 and 235. Upon receiving a connection request of the network by using the proxy server from the external electronic device via the first communication modules 215 and 235, the processors 217 and 237 may cache the connection request to the memories 212 and 232.

As described above, according to an embodiment, an electronic device (e.g., the electronic device 201) may include a first communication module (e.g., the first communication module 215), a second communication module (e.g., the second communication module 216), a display (e.g., the display 211), a processor (e.g., the processor 217) operatively coupled to the first communication module, the second communication module, and the display, and a memory (e.g., the memory 212) operatively coupled to the processor. The memory may store instructions, when executed, causing the processor to receive, from an external electronic device connected via the first communication module, first data related to a first screen on which resources of the external electronic device are configured in accordance with a graphic environment of the electronic device, output the first screen on the display, based on the received first data, when a first resource is selected from among the resources, request the external electronic device to execute the selected first resource via the first communication module, receive, from the external electronic device via the first communication module, a request for obtaining second data related to the first resource through a network connection, connect to the network via the second communication module to obtain the second data, transmit the obtained second data to the external electronic device via the first communication module, receive, from the external electronic device via the first communication module, third data related to a second screen configured using the second data, and output the second screen on the display, based on the received third data.

According to another embodiment, the instructions may cause the processor to obtain first information resulted from monitoring a first connection state in which the network is connected via the second communication module, receive, from the external electronic device via the first communication module, second information resulted from monitoring a second connection state in which the network is connected via a third communication module included in the external electronic device, and determine a communication module for obtaining the second data among the second communication module and the third communication module, based on the first information and the second information.

According to still another embodiment, the instructions may cause the processor to, upon determining, based on the first information and the second information, that it is possible to connect to the network via the second communication module and the third communication module, obtain a first part of the second data via the second communication module and transmit the obtained first part of the second data to the external electronic device via the first communication module, and request the external electronic device via the first communication module so that the external electronic device obtains a second part of the second data via the third communication module.

According to an embodiment, the instructions may cause the processor to determine a size of the first part and a size of the second part, based on the first information and the second information.

According to another embodiment, the instructions may cause the processor to set up a proxy server for connecting to the network via the second communication module, and transmit a setting value of the proxy server to the external electronic device via the first communication module.

According to still another embodiment, the instructions may cause the processor to receive a connection request of the network by using the proxy server from the external electronic device via the first communication module, and cache the connection request to the memory.

According to an embodiment, the instructions may cause the processor to, when a second resource using the network is selected from among resources of the electronic device, determine whether it is possible to connect to the network via the second communication module, and upon determining that it is impossible to connect to the network via the second communication module, request the external electronic device via the first communication module so that the external electronic device connects to the network via a third communication module included in the external electronic device to obtain fourth data related to the selected second resource.

As described above, according to an embodiment, an electronic device (e.g., the electronic device 203) may include a first communication module (e.g., the first communication module 235), a second communication module (e.g., the second communication module 236), a processor (e.g., the processor 237) operatively coupled to the first communication module and the second communication module, and a memory (e.g., the memory 232) operatively coupled to the processor. The memory may store machine readable instructions, when executed, causing the processor to receive, from an external electronic device connected via the first communication module, first data related to a first screen on which resources of the external electronic device are configured in accordance with a graphic environment of the electronic device, output the first screen on the display, based on the received first data, when a first resource is selected from among the resources, request the external electronic device to execute the selected first resource via the first communication module, receive, from the external electronic device via the first communication module, a request for obtaining second data related to the first resource through a network connection, connect to the network via the second communication module to obtain the second data, transmit the obtained second data to the external electronic device via the first communication module, receive, from the external electronic device via the first communication module, third data related to a second screen configured using the second data, and output the second screen on the display, based on the received third data.

According to another embodiment, the instructions may cause the processor to obtain first information resulted from monitoring a first connection state in which the network is connected via the second communication module, receive, from the external electronic device via the first communication module, second information resulted from monitoring a second connection state in which the network is connected via a third communication module included in the external electronic device, and determine a communication module for obtaining the second data among the second communication module and the third communication module, based on the first information and the second information.

According to still another embodiment, the instructions may cause the processor to, upon determining, based on the first information and the second information, that it is possible to connect to the network via the second communication module and the third communication module, obtain a first part of the second data via the second communication module, request the external electronic device via the first communication module so that the external electronic device obtains a second part of the second data via the third communication module, and receive the second part of the second data from the external electronic device via the first communication module.

According to an embodiment, the instructions may cause the processor to determine a size of the first part and a size of the second part, based on the first information and the second information.

According to another embodiment, the instructions may cause the processor to receive, from the external electronic device via the first communication module, a setting value of a proxy server for connecting to the network via the third communication module, and request to obtain the second data by using the setting value of the proxy server.

According to still another embodiment, the instructions may cause the processor to receive, from the external electronic device via the first communication module, a request for obtaining fourth data related to a second resource using the network among resources of the external electronic device, upon determining that it is possible to connect to the network via the second communication module, connecting to the network via the second communication module to obtain the fourth data, and transmit the obtained fourth data to the external electronic device via the first communication module.

Figure 3:
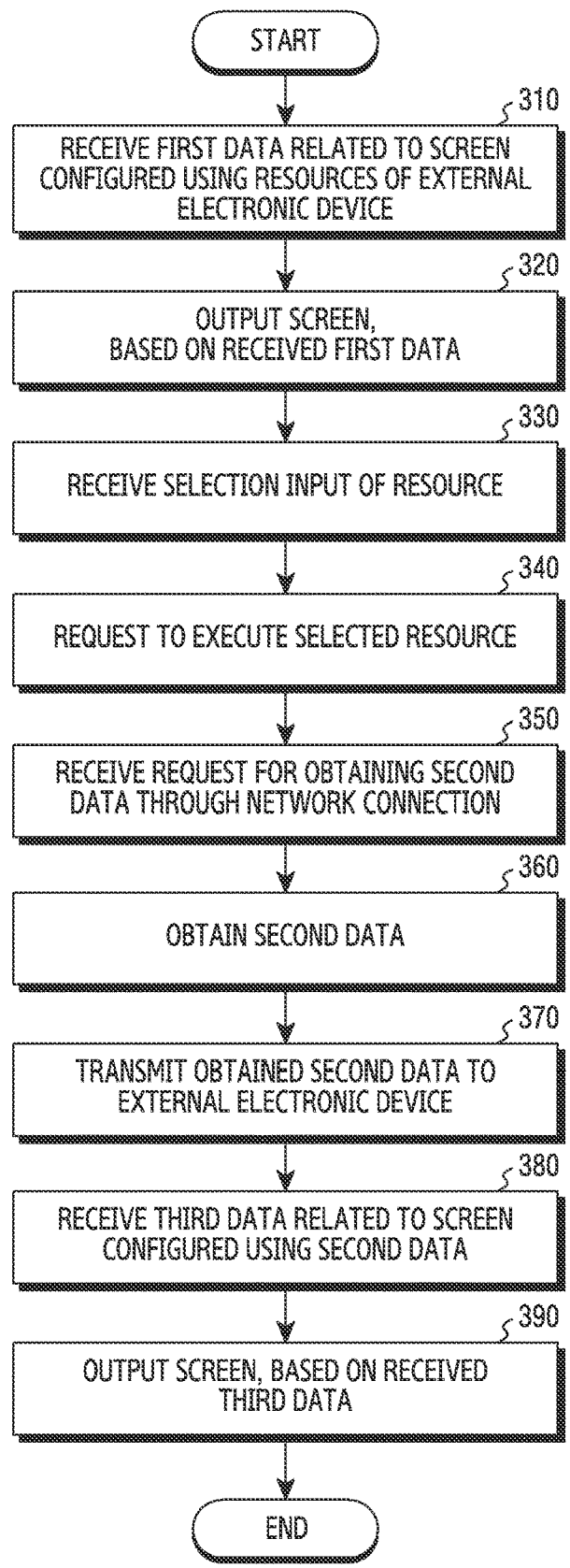
FIG. 3 is a diagram for explaining a method of operating an electronic device which provides a network connection to an external electronic according to an embodiment of the disclosure.

FIG. 3 is a diagram for explaining a method of operating an electronic device which provides a network connection to an external electronic according to an embodiment of the disclosure. In FIG. 3, for convenience of description, the electronic device and the external electronic device will be described respectively as the first electronic device 201 and second electronic device 203 of FIG. 2.

Referring to FIG. 3, in operation 310, a processor (e.g., the processor 217) of an electronic device (e.g., the first electronic device 201) may receive, from an external electronic device (e.g., the second electronic device 203) connected via a first communication module (e.g., the first communication module 215), first data related to a screen configured using resources of the external electronic devices. The processor may receive the first data related to a screen on which resources of the external electronic device are configured in accordance with a graphic environment of the electronic device.

In operation 320, the processor may output the screen on a display (e.g., the display 211), based on the received first data. For example, a user interface being displayed on the display may be maintained, and the screen may be displayed on the user interface.

In operation 330, the processor may receive a selection input of a resource requiring a network connection among resources included in the screen. For example, the processor may receive a touch input for selecting an icon of a web browsing application from among icons included in the screen.

In operation 340, the processor may request the external electronic device to execute the selected resource via the first communication module. In this case, upon determining that it is impossible to connect to the network via the second communication module (e.g., the second communication modules 216 and 236) included in the external electronic device, the external electronic device may request the electronic device to obtain second data related to the selected resource via the first communication module (e.g., the first communication modules 215 and 235).

In operation 350, the processor may receive, from the external electronic device via the first communication module, a request for obtaining the second data related to the selected resource through the network connection.

In operation 360, the processor may connect to the network via the second communication module to obtain the second data. For example, the processor may access the Internet via the second communication module to obtain web browsing data.

In operation 370, the processor may transmit the obtained second data to the external electronic device via the first communication module. In this case, the external electronic device which has received the second data may configure a screen by using the second data. The external electronic device may configure a screen in accordance with a graphic environment of the electronic device by using the second data. In addition, the external electronic device may transmit third data related to the configured screen to the electronic device via the first communication module included in the external electronic device.

In operation 380, the processor may receive, from the external electronic device via the first communication module, third data related to a screen configured using the second data. For example, the screen configured using the second data may include a web browsing screen.

In operation 390, the processor may output the screen to the display, based on the received third data.

Figure 4:
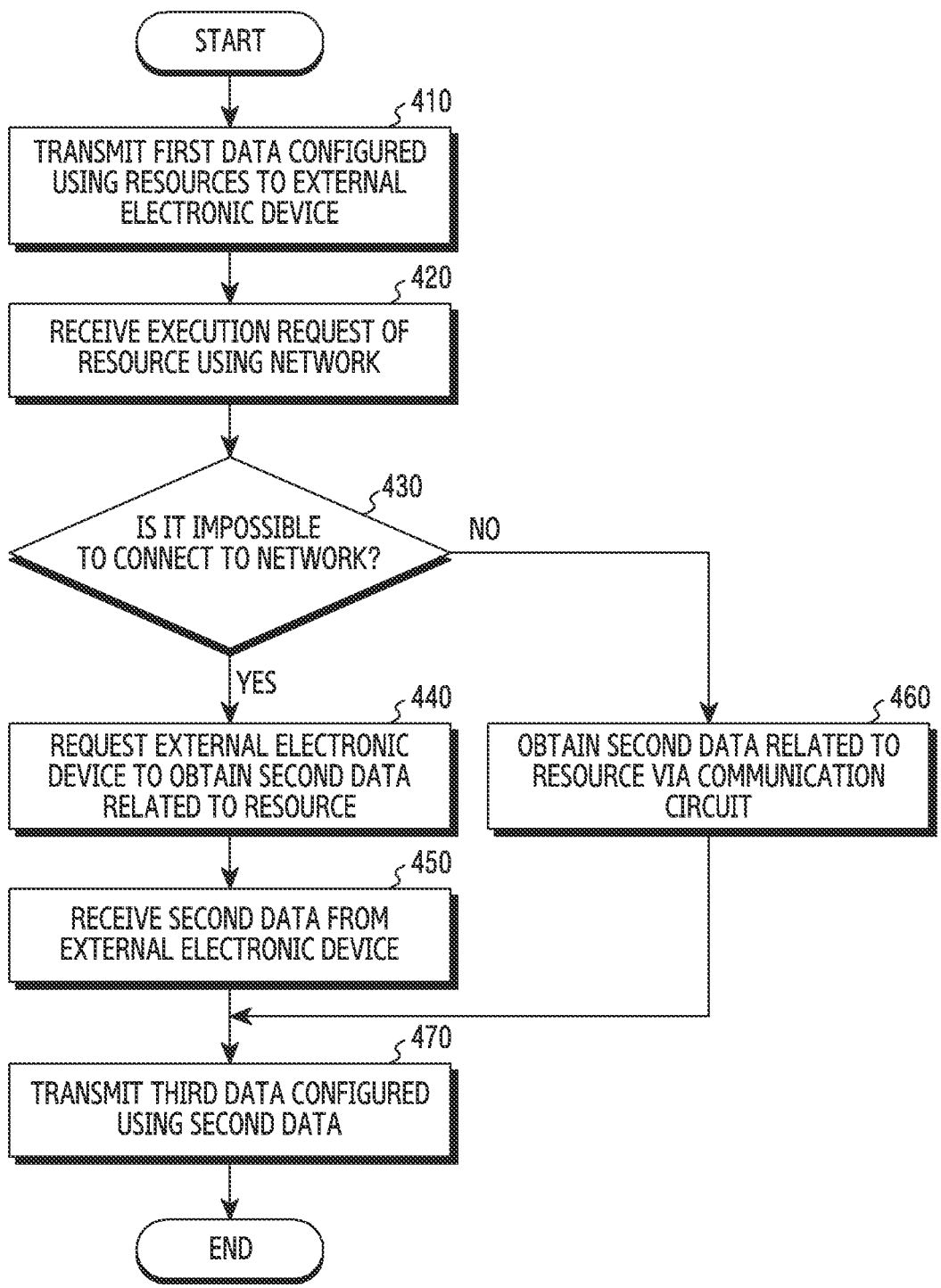
FIG. 4 is a diagram for explaining a method of operating an electronic device which connects to a network via an external electronic device according to an embodiment of the disclosure.

FIG. 4 is a diagram for explaining a method of operating an electronic device which connects to a network via an external electronic device according to an embodiment of the disclosure. In FIG. 4, for convenience of description, the electronic device and the external electronic device will be described respectively as the first electronic device 201 and second electronic device 203 of FIG. 2.

Referring to FIG. 4, in operation 410, a processor (e.g., the processor 237) of an electronic device (e.g., the second electronic device 203) may transmit, to an external electronic device (e.g., the first electronic device 201) via a first communication module (e.g., the first communication module 235), first data configured using resources of the electronic device. The processor may transmit the first data related to a screen on which resources of the electronic device are configured in accordance with a graphic environment of the external electronic device.

An external electronic device which has received the first data may output the screen to a display (e.g., the display 211) included in the external electronic device, based on the received first data. Upon receiving an input for selecting a resource requiring a network connection from among the resources included in the screen, the external electronic device may request the electronic device to execute the selected resource via the first communication module (e.g., the first communication module 215) included in the external electronic device. Upon receiving a touch input for selecting an icon of a web browsing application from among icons included in the screen, the external electronic device may request the electronic device to execute the web browsing application.

In operation 420, the processor may receive, from the external electronic device via the first communication module, an execution request of the selected resource using the network.

In operation 430, the processor may determine whether it is impossible to connect to the network via the second communication module (e.g., the second communication module 236). The processor may determine whether there is a failure in the network connection via the second communication module.

Upon determining that it is impossible to connect to the network via the second communication module, in operation 440, the processor may request the external electronic device to obtain second data related to the selected resource via the first communication module. In this case, the external electronic device which has received the request may connect to the network via the second communication module (e.g., the second communication module 216) of the external electronic device to obtain the second data. In addition, the external electronic device may transmit the obtained second data to the electronic device via the first communication module of the external electronic device. In an embodiment, the external electronic device may access the Internet via the second communication module included in the external electronic device to obtain web browsing data, and may transmit the obtained web browsing data to the electronic device.

In operation 450, the processor may receive the second data from the external electronic device via the first communication module.

Upon determining that it is possible to connect to the network via the second communication module is possible, in operation 460, the processor may connect to the network via the second communication module to obtain the second data related to the selected resource.

Upon receiving (or obtaining) the second data, in operation 470, the processor may transmit, to the external electronic device via the first communication module, third data configured using the second data. The processor may transmit the third data related to the screen configured in accordance with the graphic environment of the external electronic device by using the second data. In an embodiment, the screen configured using the second data may include a web browsing screen.

Figure 5:
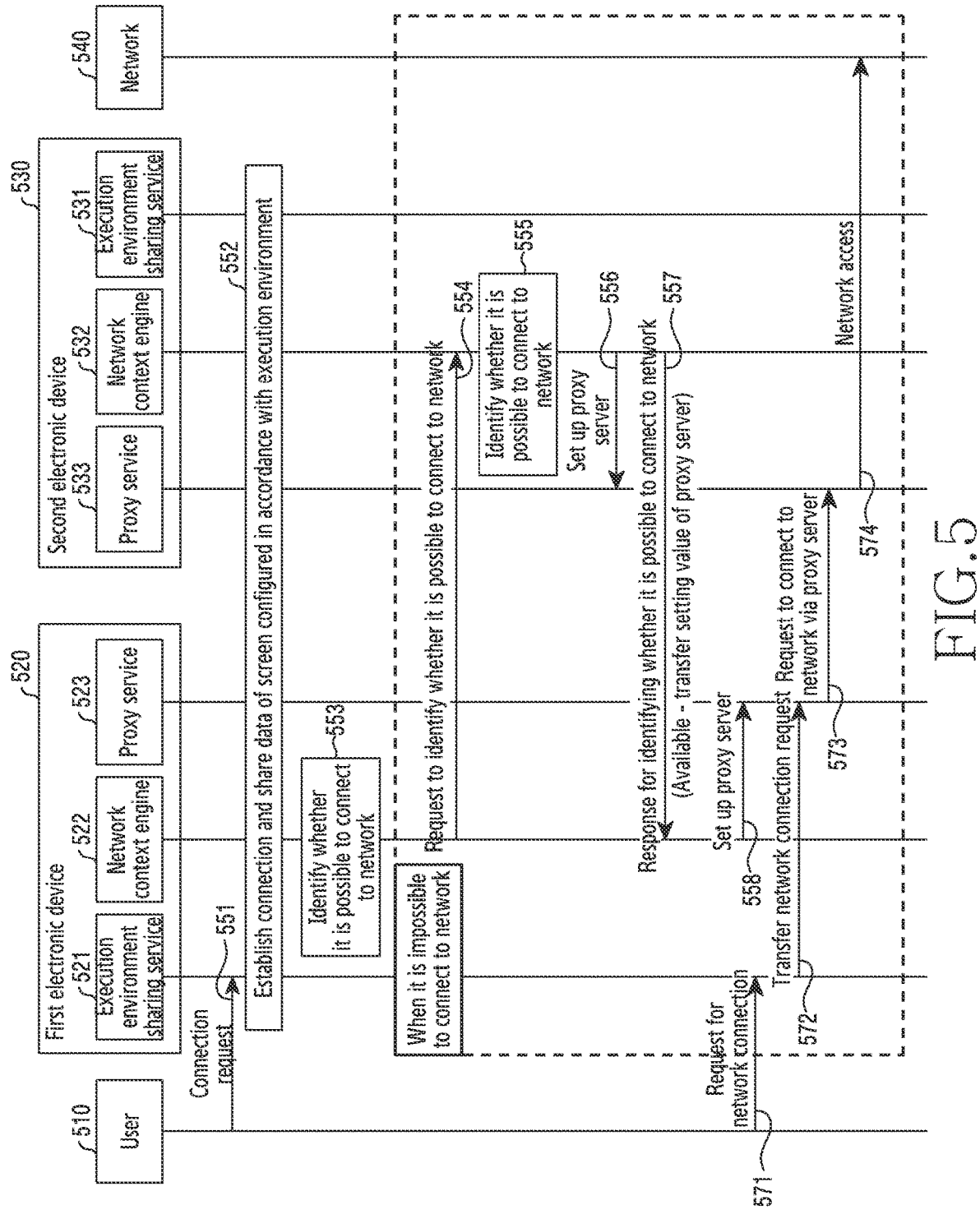
FIG. 5 is a diagram for explaining a network connection method according to an embodiment of the disclosure.

FIG. 5 is a diagram for explaining a network connection method according to an embodiment of the disclosure.

Referring to FIG. 5, in operation 551, a first electronic device 520 (e.g., the first electronic device 201 of FIG. 2) may receive a connection request with respect to a second electronic device 530 (e.g., the second electronic device 203 of FIG. 2) from a user 510. The connection request may include, for example, a connection request for sharing an execution environment between the first electronic device 520 and the second electronic device 530. When an icon of an execution environment sharing application installed in the first electronic device 520 is selected by the user 510, the connection request may be received together with an execution request of the execution environment sharing application.

In response to the connection request, in operation 552, an execution environment sharing service 521 of the first electronic device 520 may establish connection between the first electronic device 520 and the second electronic device 530 in association with an execution environment sharing server 531 of the second electronic device 530. For example, the first electronic device 520 and the second electronic device 530 may be coupled to each other via a first communication module (e.g., the first communication module 215) of the first electronic device 520 and a first communication module (e.g., the first communication module 235) of the second electronic device 530. When the connection between the first electronic device 520 and the second electronic device 530 is established, the execution environment sharing service 521 of the first electronic device 520 may transfer data of a screen on which resources of the first electronic device 520 are configured in accordance with an execution environment (or graphic environment) of the second electronic device 530, and may share the data. In this case, the second electronic device 530 may output, to a display (e.g., the display 231) of the second electronic device 530, the screen related to the resources of the first electronic device 520 by using the screen data.

In operation 553, a network context engine 522 of the first electronic device 520 may identify whether it is possible to connect to a network 540 via a second communication module (e.g., the second communication module 215) of the first electronic device 520. The network context engine 522 may persistently monitor a connection state (e.g., signal strength, connection adaptor information, packet information, etc.) in which the network 540 is connected via the second communication module of the first communication device 520. For example, the network context engine 522 may obtain information resulted from monitoring the connection state in which the network is connected via the second communication module of the first electronic device 520, and may identify whether it is possible to connect to the network 540, based on the monitoring information. As another example, in a situation in which the connection to the network 540 via the second communication module is not established or signal strength is less than a specified magnitude, the network context engine 522 may determine that it is impossible to connect to the network 540.

When it is impossible to connect to the network 540 via the second communication module of the first electronic device 520, in operation 554, the network context engine 522 may request a network context engine 532 of the second electronic device 530 to identify whether it is possible to connect to the network 540.

In operation 555, the network context engine 532 of the second electronic device 530 may identify whether it is possible to connect to the network 540 via the second communication module (e.g., the second communication module 215) of the first electronic device 520. The network context engine 532 may persistently monitor a connection state (e.g., signal strength, connection adaptor information, packet information, etc.) in which the network 540 is connected via the second communication module (e.g., the second communication module 236) of the second communication device 530. For example, the network context engine 532 may obtain information resulted from monitoring the connection state in which the network is connected via the second communication module of the second electronic device 530, and may identify whether it is possible to connect to the network 540, based on the monitoring information. As another example, in a situation in which signal strength of the connection with respect to the network 540 via the second communication module is greater than or equal to the specified magnitude, the network context engine 532 may determine that it is possible to connect to the network 540.

For example, when it is possible to connect to the network 540 via the second communication module of the second electronic device 530, in operation 556, the network context engine 532 may request a proxy service 533 of the second electronic device 530 to set up a proxy server. According to an embodiment, the proxy service 533 may set up the proxy server for connecting to the network 540 via the second communication module of the second electronic device 530.

In operation 557, the network context engine 532 may transfer, to the network context engine 522 of the first electronic device 520, a response for identifying whether it is possible to connect to the network 540. For example, when it is possible to connect to the network 540 via the second communication module of the second electronic device 530, the network context engine 532 may transfer to the network context engine 522 of the first electronic device 520 a setting value (e.g., IP information and port information) of the proxy server.

In operation 558, the network context engine 522 may request to set up the proxy server while transmitting to a proxy service 523 of the first electronic device 520 the setting value of the proxy server, received from the network context engine 532 of the second electronic device 530. The proxy service 523 may, for example, set up the proxy server by using the setting value of the proxy server.

In operation 571, the first electronic device 520 may receive a network connection request from the user 510. As an example, the network connection request may be received when a resource requiring the connection of the network 540 is selected from among resources of the first electronic device 520. As another example, the network connection request may be received when an icon of a web browsing application is selected from among icons included in a screen shared with the second electronic device 530.

In operation 572, the execution environment sharing service 521 of the first electronic device 520 which has received the network connection request may transfer the network connection request to the proxy server 523.

In operation 573, the proxy server 523 may request the proxy server 533 of the second electronic device 530 to connect to the network 540 via the proxy server.

In operation 574, the proxy server 533 may access the network 540. The proxy service 533 may forward the network connection request of the user 510 to an actual URL.

As described above, according to various embodiments, a network connection method of an electronic device (e.g., the first electronic device 201) may include receiving, from an external electronic device (e.g., the second electronic device 203) connected via a first communication module of the electronic device, first data related to a first screen on which resources of the external electronic device are configured in accordance with a graphic environment of the electronic device, outputting the first screen on a display of the electronic device, based on the received first data, when a first resource is selected from among the resources, requesting the external electronic device to execute the selected first resource via the first communication module, receiving, from the external electronic device via the first communication module, a request for obtaining second data related to the first resource through a network connection, connecting to the network via a second communication module of the electronic device to obtain the second data, transmitting the obtained second data to the external electronic device via the first communication module, receiving, from the external electronic device via the first communication module, third data related to a second screen configured using the second data, and outputting the second screen on the display, based on the received third data.

According to an embodiment, the network connection method may further include obtaining first information resulted from monitoring a first connection state in which the network is connected via the second communication module, receiving, from the external electronic device via the first communication module, second information resulted from monitoring a second connection state in which the network is connected via a third communication module included in the external electronic device, and determining a communication module for obtaining the second data among the second communication module and the third communication module, based on the first information and the second information.

According to another embodiment, the network connection method may further include, upon determining, based on the first information and the second information, that it is possible to connect to the network via the second communication module and the third communication module, obtaining a first part of the second data via the second communication module and transmit the obtained first part of the second data to the external electronic device via the first communication module, and requesting the external electronic device via the first communication module so that the external electronic device obtains a second part of the second data via the third communication module.

According to still another embodiment, the network connection method may further include determining a size of the first part and a size of the second part, based on the first information and the second information.

According to an embodiment, the network connection method may further include setting up a proxy server for connecting to the network via the second communication module, and transmitting a setting value of the proxy server to the external electronic device via the first communication module.

According to another embodiment, the receiving of the request for obtaining the second data may include receiving a connection request of the network by using the proxy server from the external electronic device via the first communication module, and caching the connection request to the memory.

According to still another embodiment, the network connection method may include, when a second resource using the network is selected from among resources of the electronic device, determining whether it is possible to connect to the network via the second communication module, and upon determining that it is impossible to connect to the network via the second communication module, requesting the external electronic device via the first communication module so that the external electronic device connects to the network via a third communication module included in the external electronic device to obtain fourth data related to the selected second resource.

Figure 6A:
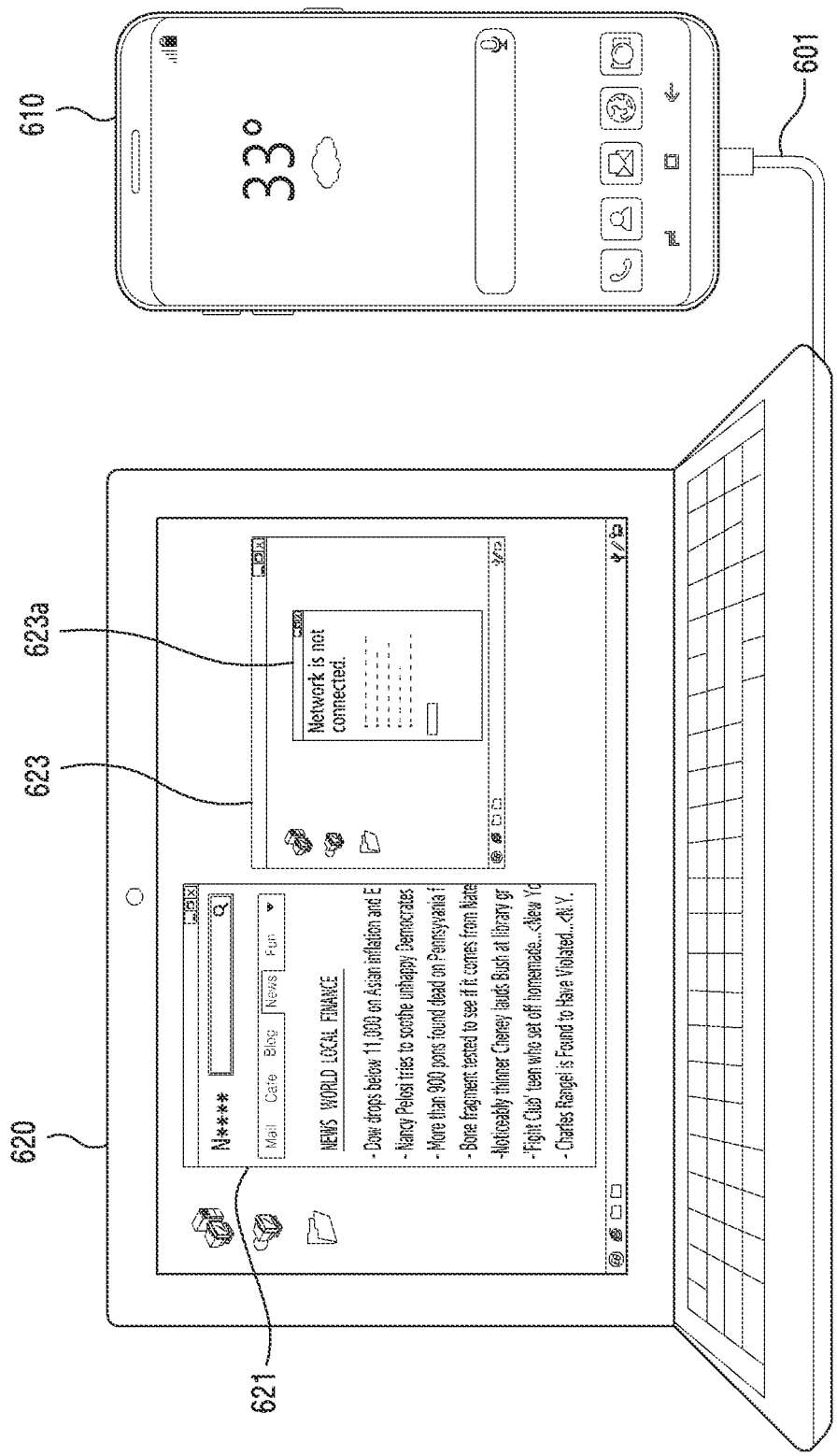
FIGS. 6A and 6B are diagrams for explaining a method of connecting to a network via an external electronic device according to various embodiments of the disclosure.
Figure 6B:
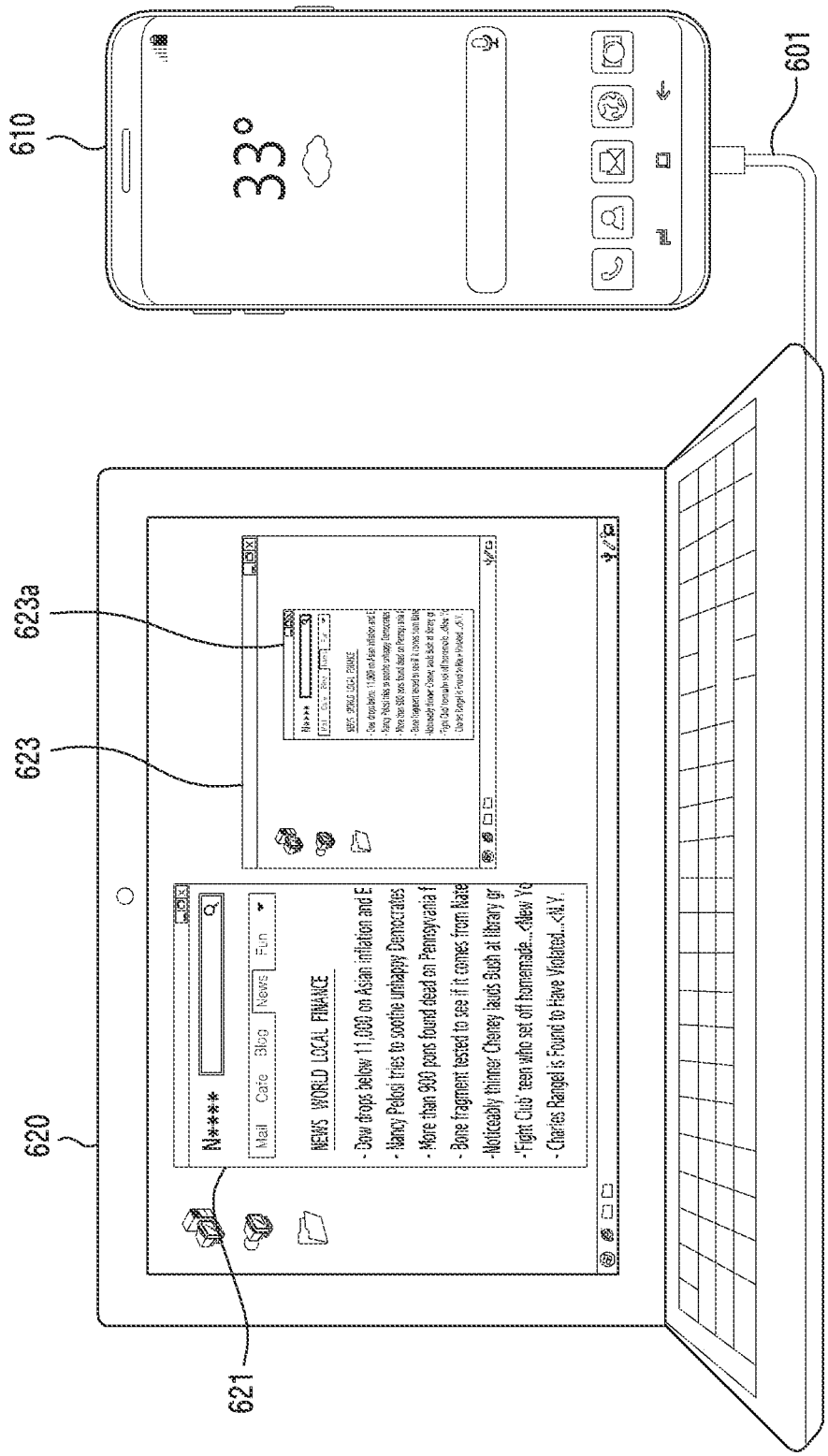

FIGS. 6A and 6B are diagrams for explaining a method of connecting to a network via an external electronic device according to various embodiments of the disclosure. A first electronic device 610 (e.g., a smart phone) (e.g., the first electronic device 201 of FIG. 2) and a second electronic device 620 (e.g., a PC) (e.g., the second electronic device 203 of FIG. 2) illustrated in FIGS. 6A and 6B may be devices which share an execution environment. FIG. 6A illustrates a case where the first electronic device 610 and the second electronic device 620 provide only a function of sharing a graphic environment, and FIG. 6B illustrates a case where the first electronic device 610 and the second electronic device 620 provide not only the function of sharing the graphic environment but also a function of sharing a communication environment for a network connection.

Referring to FIGS. 6A and 6B, the first electronic device 610 and the second electronic device 620 may be coupled to each other to share an execution environment. A state in which the first electronic device 610 and the second electronic device 620 are directly coupled through a USB cable 601 is illustrated in FIGS. 6A and 6B.

In a situation in which the first electronic device 610 and the second electronic device 630 are coupled, an execution screen of an application installed in the first electronic device 610 may be configured in accordance with a graphic environment of the second electronic device 620, and may be output to a display of the second electronic device 620. In this case, a user interface being displayed on the display of the second electronic device 620 may be maintained, and the execution screen of the application installed in the first electronic device 610, which is configured in accordance with the graphic environment of the second electronic device 620, may be displayed on the user interface.

As shown in FIGS. 6A and 6B, an execution screen 621 of a first application installed in the second electronic device 620 and resources of the first electronic device 610 may be displayed on the display of the second electronic deice 620, together with a screen 623 configured in accordance with the graphic environment of the second electronic device 620. The resources may include, for example, icons of applications installed in the first electronic device 610.

The screen 623 and the execution screen 621 of a first application may be displayed on the display of the second electronic device 620 through separate windows. When any one resource is selected from among the resources of the first electronic device 610 included in the screen 623, the first electronic device 610 may execute the selected resource, and an execution screen of the resource may be displayed in the screen 623 by being configured in accordance with the graphic environment of the second electronic device 620. In a case in which an icon of the second application installed in the first electronic device 610 included in the screen 623 is selected, the first electronic device 610 may execute the selected second application, and may transfer an execution screen of the second application to the second electronic device 620 by configuring the screen in accordance with the graphic environment of the second electronic device 620. The second electronic device 620 may display, in the screen 623, an execution screen 623a of the second application, configured in accordance with the graphic environment of the second electronic device 620. The execution screen 623a of the second application may also be displayed in the screen 623 through a separate window.

In a situation in which the selected resource is a resource (e.g., a web browsing application) requiring a network connection, the first electronic device 610 may connect to the network via a communication module to obtain data (e.g., web browsing data) related to the resource. When it is impossible to connect to the network via the communication module of the first electronic device 610, i.e., if the first electronic device 610 and the second electronic device 620 do not share a communication environment for a network connection, the first electronic device 610 may not be able to obtain data related to the resource. In this case, as shown in FIG. 6A, a screen indicating that it is impossible to connect to the network may be displayed on the execution screen of the resource (the execution screen 623a of the second application).

In various embodiments of the disclosure, a function for sharing a communication environment for a network connection between the first electronic device 610 and the second electronic device 620 may be provided. When it is impossible to connect to the network via the communication module of the first electronic device 610, the first electronic device 610 may connect to the network via the communication module of the second electronic device 620 to obtain data related to the resource. In this case, as shown in FIG. 6B, a screen (e.g., a web browsing screen) using the obtained data may be displayed on the execution screen of the resource (the execution screen 623a of the second application).

Figure 7A:
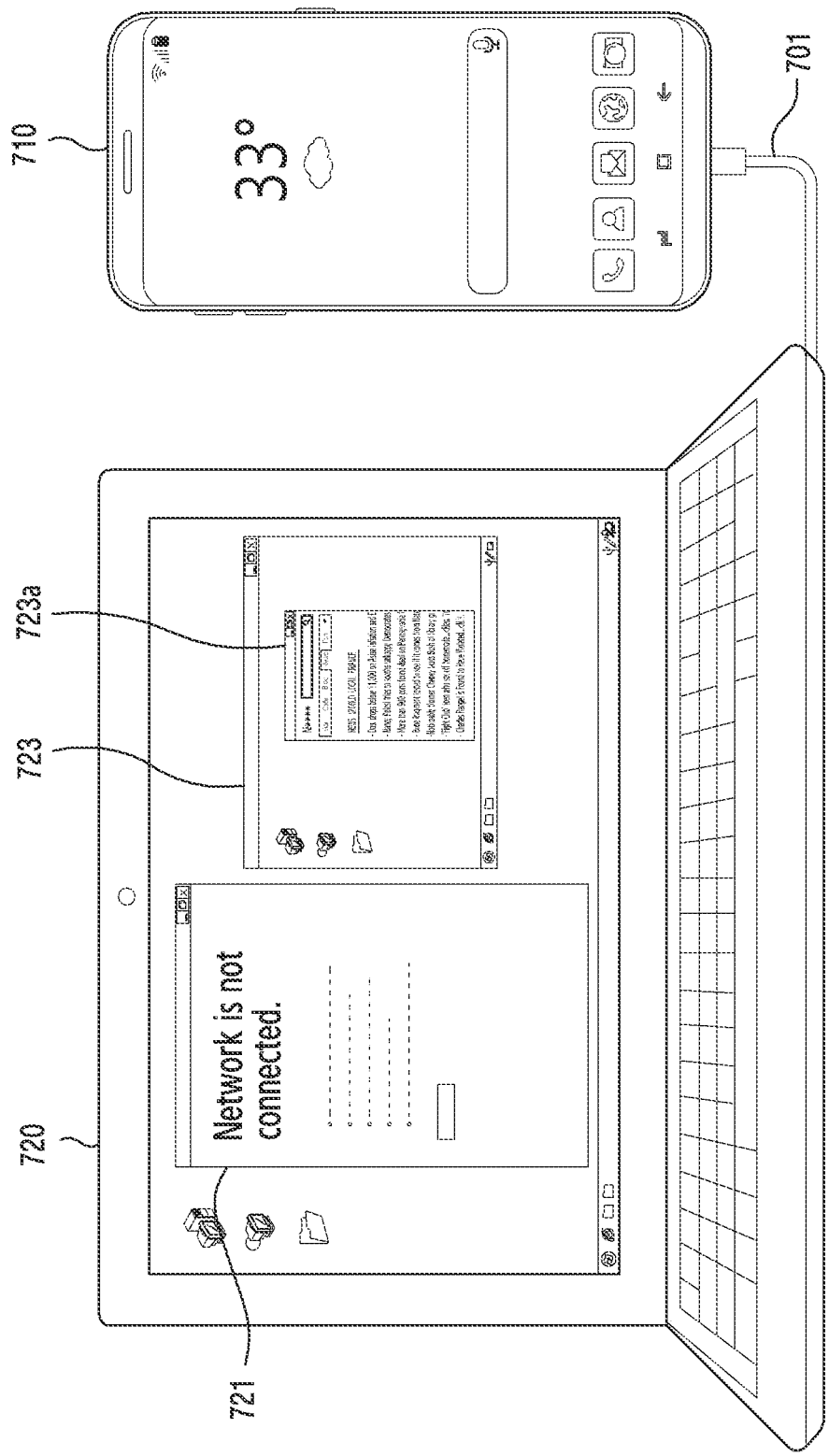
FIGS. 7A and 7B are diagrams for explaining another method of connecting to a network via an external electronic device according to various embodiments of the disclosure.
Figure 7B:
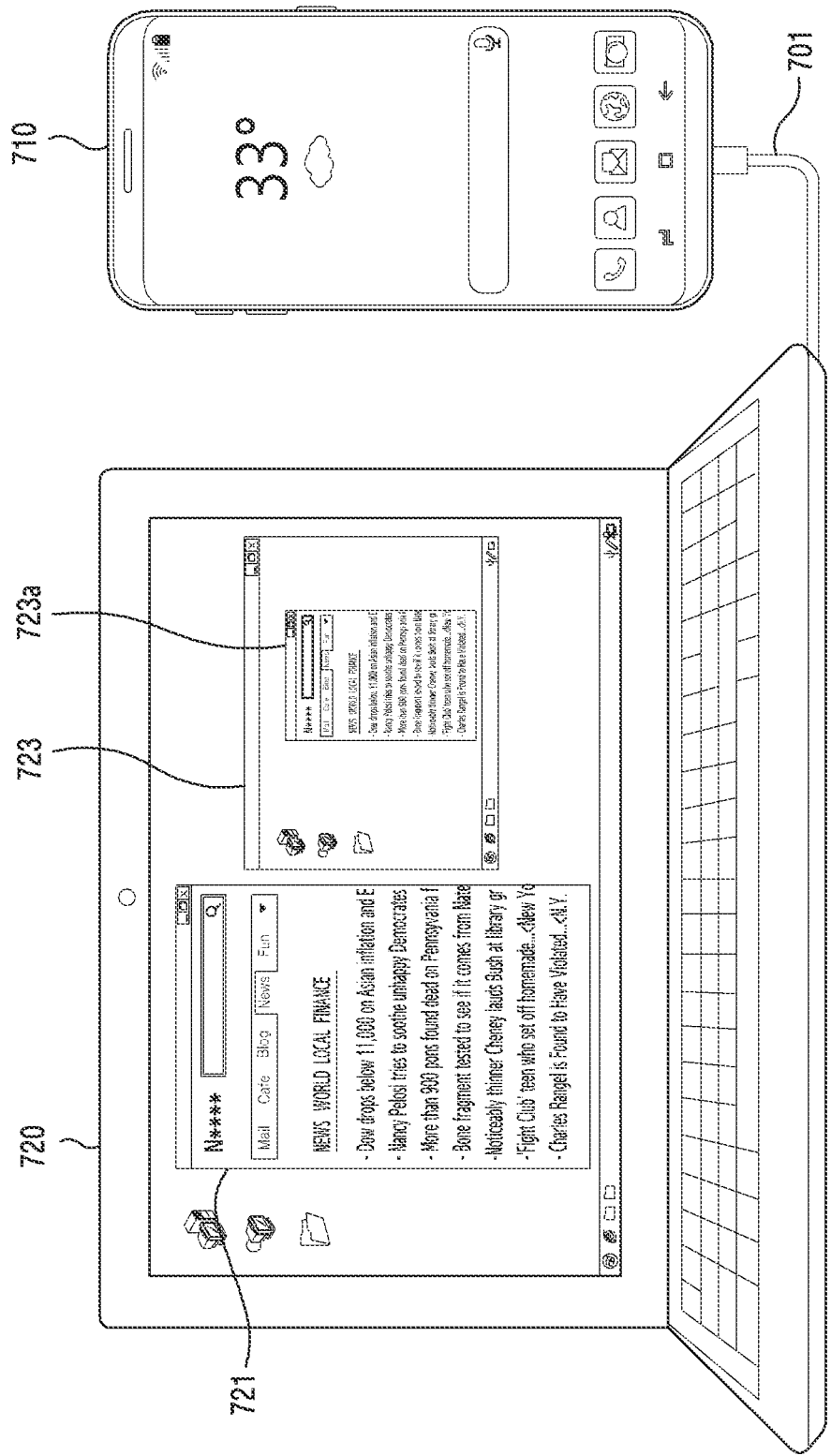

FIGS. 7A and 7B are diagrams for explaining another method of connecting to a network via an external electronic device according to various embodiments of the disclosure. A first electronic device 710 (e.g., a smart phone) (e.g., the first electronic device 201 of FIG. 2) and a second electronic device 720 (e.g., a PC) (e.g., the second electronic device 203 of FIG. 2) illustrated in FIGS. 7A and 7B may be devices which share an execution environment. FIG. 7A illustrates a case where the first electronic device 710 and the second electronic device 720 provide only a function of sharing a graphic environment, and FIG. 7B illustrates a case where the first electronic device 710 and the second electronic device 720 provide not only the function of sharing the graphic environment but also a function of sharing a communication environment for a network connection. In addition, a state in which the second electronic device 720 is not able to connect to the network is shown in FIGS. 7A and 7B, whereas a state in which the first electronic device 610 is not able to connect to the network is shown in FIGS. 6A and 6B.

Referring to FIGS. 7A and 7B, the first electronic device 710 and the second electronic device 720 may be coupled to each other to share an execution environment. A state in which the first electronic device 710 and the second electronic device 720 are directly coupled through a USB cable 701 is illustrated in FIGS. 7A and 7B.

In a situation in which the first electronic device 710 and the second electronic device 720 are coupled, an execution screen of an application installed in the first electronic device 710 may be configured in accordance with a graphic environment of the second electronic device 720, and may be output to a display of the second electronic device 720. In this case, a user interface being displayed on the display of the second electronic device 720 may be maintained, and the execution screen of the application installed in the first electronic device 710, which is configured in accordance with the graphic environment of the second electronic device 720, may be displayed on the user interface.

As shown in FIGS. 7A and 7B, an execution screen 721 of a first application installed in the second electronic device 720 and resources of the first electronic device 710 may be displayed on the display of the second electronic deice 720, together with a screen 723 configured in accordance with the graphic environment of the second electronic device 720. The resources may include, for example, icons of applications installed in the first electronic device 710.

The screen 723 and the execution screen 721 of a first application may be displayed on the display of the second electronic device 720 through separate windows. When any one resource is selected from among the resources of the first electronic device 710 included in the screen 723, the first electronic device 710 may execute the selected resource, and an execution screen of the resource may be displayed in the screen 723 by being configured in accordance with the graphic environment of the second electronic device 720. In a case in which an icon of the second application installed in the first electronic device 710 included in the screen 723 is selected, the first electronic device 710 may execute the selected second application, and may transfer an execution screen of the second application to the second electronic device 720 by configuring the screen in accordance with the graphic environment of the second electronic device 720. The second electronic device 720 may display, in the screen 723, an execution screen 723a of the second application, configured in accordance with the graphic environment of the second electronic device 720. The execution screen 723a of the second application may also be displayed in the screen 723 through a separate window.

When the selected resource is a resource (e.g., a web browsing application) requiring a network connection, the first electronic device 710 may connect to the network via a communication module to obtain data (e.g., web browsing data) related to the resource. In addition, a screen (e.g., a web browsing screen) using the obtained data may be displayed on the execution screen of the resource (the execution screen 723a of the second application).

When the first application is an application (e.g., web browsing application) requiring a network connection and when it is impossible to connect to the network via the communication module of the second electronic device 720, i.e., if the first electronic device 710 and the second electronic device 720 do not share a communication environment for the network connection, the second electronic device 720 may not be able to obtain data (e.g., web browsing data) related to the first application. In this case, as shown in FIG. 7A, a screen indicating that it is impossible to connect to the network may be displayed on the execution screen 721 of the first application.

In an embodiment of the disclosure, a function for sharing a communication environment for the network connection between the first electronic device 710 and the second electronic device 720 may be provided. For example, when it is impossible to connect to the network via the communication module of the second electronic device 720, the second electronic device 720 may connect to the network via the communication module of the first electronic device 710 to obtain data related to the first application. In this case, as shown in FIG. 7B, a screen (e.g., a web browsing screen) using the obtained data may be displayed on the execution screen 721 of the first application.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to another embodiment of the disclosure, the various types of electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more machine-readable instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory computer-readable storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. For example, the computer program product may be traded as a product between a seller and a buyer. In another embodiment, the computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   first communication circuitry;
   second communication circuitry;
   a display;
   memory storing one or more computer programs; and
   one or more processors,
   wherein the one or more computer programs include computer-executable instructions which, when executed by the one or more processors, cause the electronic device to:
   establish, via the first communication circuitry, a communication connection between the electronic device and an external electronic device,
   receive, from the external electronic device via the communication connection, first data related to a first screen,
   based on the first data, output, on the display, the first screen for resources of the external electronic device, wherein the resources of the external electronic device are configured on the first screen in accordance with a graphic environment of the electronic device, the resources of the external electronic device comprising icons of applications installed in the external electronic device,
   based on that a first resource requiring a network connection is selected from among the resources of the external electronic device, determine communication circuitry for obtaining second data related to the first resource from among the second communication circuitry of the electronic device and third communication circuitry of the external electronic device, wherein, to determine the communication circuitry, the one or more computer programs further include computer-executable instructions which, when executed by the one or more processors, cause the electronic device to:
      obtain first information resulted from monitoring a first connection state in which a network is connected via the second communication circuitry of the electronic device;
      receive, from the external electronic device via the communication connection, second information resulted from monitoring a second connection state in which the network is connected via the third communication circuitry of the external electronic device; and
      based on the first information and the second information, determine the communication circuitry for obtaining the second data related to the first resource, the first information comprising at least one of a quality level and a cost of the second communication circuitry of the electronic device, and the second information comprising at least one of a quality level and a cost of the third communication circuitry of the external electronic device,
   if the determined communication circuitry is the third communication circuitry of the external electronic device, transmit, via the communication connection to the external electronic device, a request to obtain the second data related to the first resource so that the external electronic device obtains the second data via a first network connection by the third communication circuitry of the external electronic device,
   if the determined communication circuitry is the second communication circuitry of the electronic device, obtain the second data related to the first resource via a second network connection by the second communication circuitry of the electronic device,
   transmit the obtained second data to the external electronic device via the communication connection, receive, from the external electronic device via the communication connection, third data related to a second screen configured using the second data, and based on the third data, output the second screen on the display.

2. The electronic device of claim 1, wherein the one or more computer programs further include computer-executable instructions which, when executed by the one or more processors, cause the electronic device to:
in response to determining that it is possible to connect to the network via the second communication circuitry and the third communication circuitry based on the first information and the second information, obtain a first part of the second data via the second communication circuitry and transmit the first part of the second data to the external electronic device via the communication connection, and
transmit, via the communication connection to the external electronic device, a request to obtain a second part of the second data via the third communication circuitry.

3. The electronic device of claim 2, wherein the one or more computer programs further include computer-executable instructions which, when executed by the one or more processors, cause the electronic device to:
based on the first information and the second information, determine a size of the first part and a size of the second part.

4. The electronic device of claim 1, wherein the one or more computer programs further include computer-executable instructions which, when executed by the one or more processors, cause the electronic device to:
set up a proxy server for connecting to a network via the second communication circuitry, and
transmit a setting value of the proxy server to the external electronic device via the communication connection.

5. The electronic device of claim 4, wherein the one or more computer programs further include computer-executable instructions which, when executed by the one or more processors, cause the electronic device to:
receive, from the external electronic device via the communication connection, a connection request of the network by using the proxy server, and
cache the connection request to the memory.

6. The electronic device of claim 1,
wherein the outputting of the first screen on the display comprises outputting a second window of a second application installed on the electronic device together with a first window of the first screen on the display, and
wherein the first window and the second window are output as separate windows.

7. A network connection method performed by an electronic device, the network connection method comprising:
establishing, via first communication circuitry of the electronic device, a communication connection between the electronic device and an external electronic device;
receiving, from the external electronic device connected via the communication connection, first data related to a first screen;
based on the first data, outputting, on a display of the electronic device, the first screen for resources of the external electronic device, wherein the resources of the external electronic device are configured on the first screen in accordance with a graphic environment of the electronic device, the resources comprising icons of applications installed in the external electronic device;
based on that a first resource requiring a network connection is selected from among the resources of the external electronic device, determining communication circuitry for obtaining second data related to the first resource from among second communication circuitry of the electronic device and third communication circuitry of the external electronic device, wherein the determining of the communication circuitry comprises:
obtaining first information resulted from monitoring a first connection state in which a network is connected via the second communication circuitry of the electronic device,
receiving, from the external electronic device via the communication connection, second information resulted from monitoring a second connection state in which the network is connected via the third communication circuitry of the external electronic device, and
based on the first information and the second information, determining the communication circuitry for obtaining the second data related to the first resource, the first information comprising at least one of a quality level and a cost of the second communication circuitry of the electronic device, and the second information comprising at least one of a quality level and a cost of the third communication circuitry of the external electronic device;
if the determined communication circuitry is the third communication circuitry of the external electronic device, transmitting, via the communication connection to the external electronic device, a request to obtain the second data related to the first resource so that the external electronic device obtains the second data via a first network connection by the third communication circuitry of the external electronic device;
if the determined communication circuitry is the second communication circuitry of the electronic device, obtaining the second data related to the first resource via a second network connection by the second communication circuitry of the electronic device;
transmitting the obtained second data to the external electronic device via the communication connection;
receiving, from the external electronic device via the communication connection, third data related to a second screen configured using the second data; and
based on the third data, outputting the second screen on the display.

8. The network connection method of claim 7, further comprising:
in response to determining that it is possible to connect to the network via the second communication circuitry and the third communication circuitry based on the first information and the second information, obtaining a first part of the second data via the second communication circuitry and transmitting the first part of the second data to the external electronic device via the communication connection; and
transmitting, via the communication connection to the external electronic device, a request to obtain a second part of the second data via the third communication circuitry.

9. The network connection method of claim 8, further comprising:

based on the first information and the second information, determining a size of the first part and a size of the second part.

10. The network connection method of claim 8,
wherein the outputting of the first screen on the display comprises outputting a second window of a second application installed on the electronic device together with a first window of the first screen on the display, and
wherein the first window and the second window are output as separate windows.

11. The network connection method of claim 7, further comprising:
setting up a proxy server for connecting to a network via the second communication circuitry; and
transmitting a setting value of the proxy server to the external electronic device via the communication connection.

12. The network connection method of claim 11, further comprising:
receiving, from the external electronic device via the communication connection, a connection request of the network by using the proxy server; and
caching the connection request to memory.

* * * * *